United States Patent [19]

Kamen et al.

[11] Patent Number: 5,200,173
[45] Date of Patent: * Apr. 6, 1993

[54] MOLDED COSMETIC PRODUCTS CONTAINING UNIFORM ULTRA GLOSSY WET LOOK SURFACE FINISH

[75] Inventors: Melvin E. Kamen, Highlands; Philip Bernstein, Glen Ridge, both of N.J.

[73] Assignee: Revlon Consumer Products Corporation, New York, N.Y.

[*] Notice: The portion of the term of this patent subsequent to Dec. 18, 2007 has been disclaimed.

[21] Appl. No.: 740,170

[22] Filed: Aug. 5, 1991

Related U.S. Application Data

[62] Division of Ser. No. 400,834, Aug. 30, 1989, Pat. No. 5,108,667.

[51] Int. Cl.$^5$ .............................................. A61K 7/027
[52] U.S. Cl. ........................................ 424/64; 132/320; 264/22; 264/83; 264/338; 264/39; 424/401; 424/DIG. 5; 425/DIG. 32; 427/535
[58] Field of Search ............... 264/39, 330, 130, 131, 264/134, 22, 25, 83, 338, 101; 249/115, 135, 134; 425/803, DIG. 32; 132/320; 427/34, 40, 41; 424/64, 401, DIG. 5, 63

[56] References Cited

U.S. PATENT DOCUMENTS

| | | | |
|---|---|---|---|
| 2,932,386 | 4/1960 | Ushkow | 425/DIG. 32 |
| 3,947,571 | 3/1976 | Murphy et al. | 424/64 |
| 4,188,426 | 2/1980 | Auerbach | 427/40 |
| 4,291,018 | 9/1981 | Oeda et al. | 424/64 |
| 4,624,810 | 11/1986 | Sisbarro | 264/330 |
| 4,634,368 | 1/1987 | Diaz | 425/DIG. 32 |
| 4,725,658 | 2/1988 | Thayer et al. | 528/26 |
| 4,743,443 | 5/1988 | Pisani et al. | 424/DIG. 5 |
| 4,828,826 | 5/1989 | Franz et al. | 424/63 |
| 4,978,524 | 12/1990 | Kamen et al. | 424/64 |
| 4,980,112 | 12/1990 | Masers | 249/134 |
| 4,996,044 | 2/1991 | Mercado et al. | 424/64 |

FOREIGN PATENT DOCUMENTS

| | | | |
|---|---|---|---|
| 58-15904 | 1/1983 | Japan | 424/64 |
| 60-115510 | 6/1985 | Japan | 424/64 |

Primary Examiner—Jan H. Silbaugh
Assistant Examiner—Mathieu Vargot
Attorney, Agent, or Firm—Julie Blackburn

[57] ABSTRACT

Molded cosmetic products, containing a uniform ultra glossy wet look surface finish are molded in polymeric molds or mold inserts whose inner walls have been modified by subjecting them to a plasma treatment. This allows an improved release of the products and imparts the wet look surface finish to the cosmetic products.

1 Claim, 6 Drawing Sheets

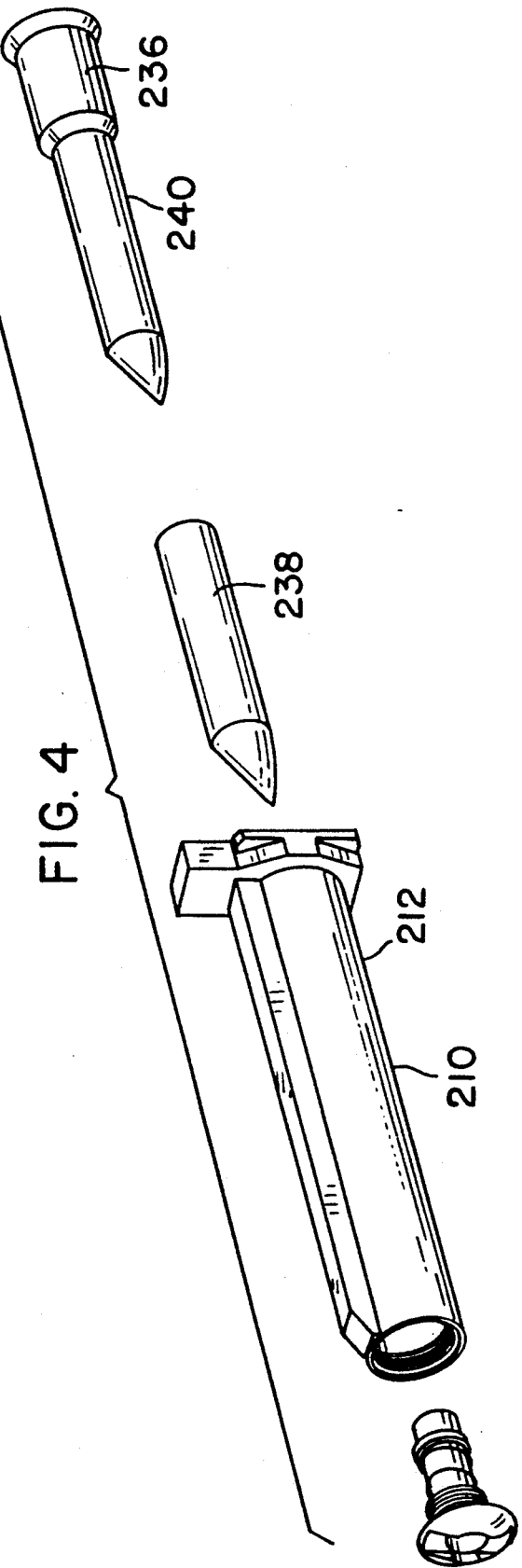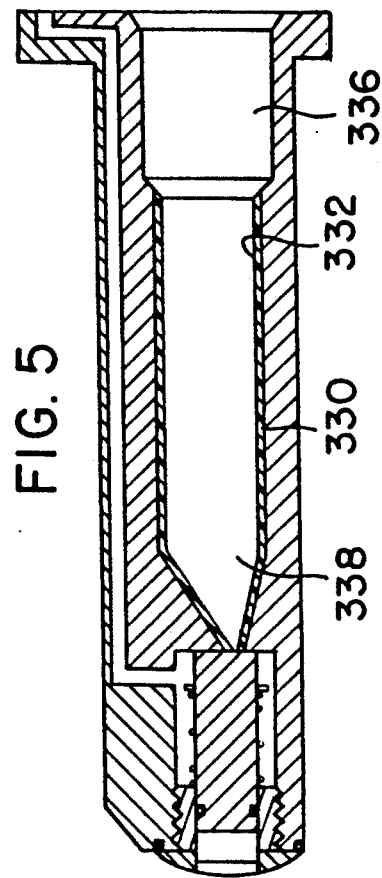

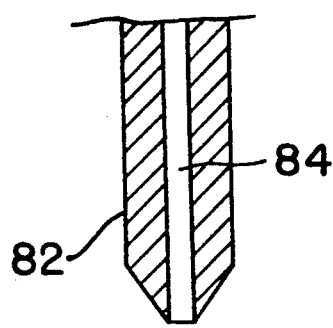
FIG. 7A
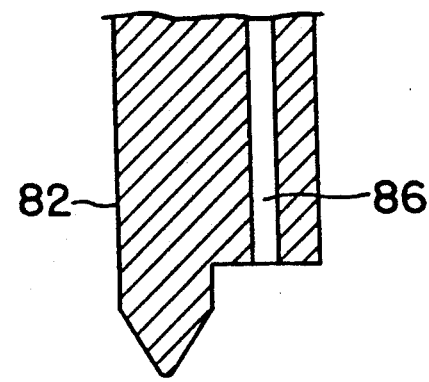
FIG. 7B
FIG. 8
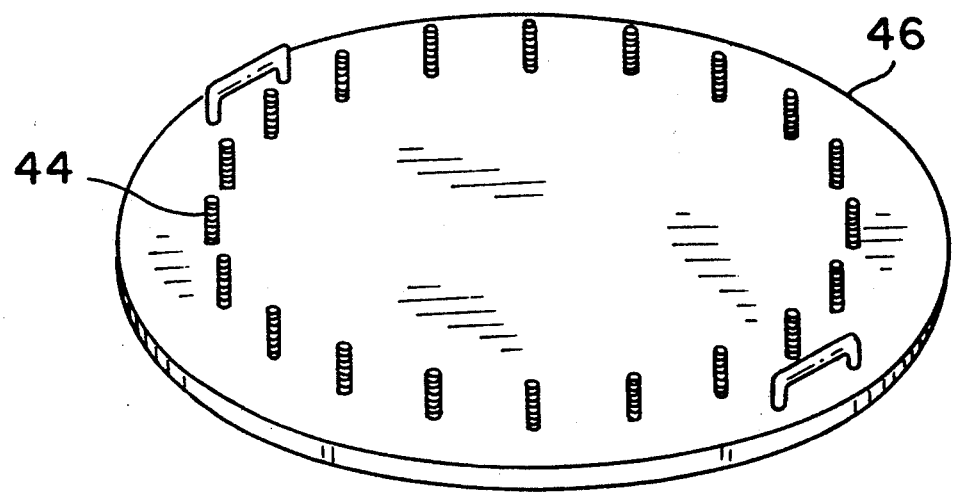
FIG. 8A
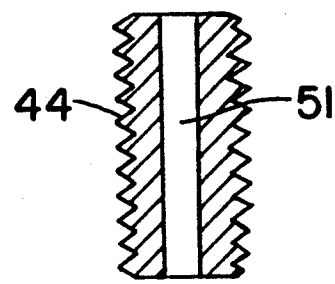

MOLDED COSMETIC PRODUCTS CONTAINING UNIFORM ULTRA GLOSSY WET LOOK SURFACE FINISH

This is a divisional of copending application Ser. No. 07/400,834 filed on Aug. 30, 1989, now U.S. Pat. No. 5,108,667.

FIELD OF THE INVENTION

The present invention relates to a process for the manufacturing of molded products, using polymer molds or polymer mold inserts of which the surface characteristics of the inner walls thereof have been modified; the modified polymer molds and mold inserts utilized therein; and the improved, molded products having uniform, high-gloss finishes obtained therewith.

BACKGROUND OF THE INVENTION

In the manufacture of most molded products, adhesion between the mold and the material being molded often causes the problems of poor product release from the mold and a product with a non-uniform matte finish. This is particularly so in the production of cosmetics and especially so with lipstick production. Because such a non-uniform matte finish reduces a lipstick's aesthetic appearance, efforts have been made to provide lipstick with a shinier and more uniform (i.e., a more cosmetic) appearance.

One common technique for eliminating the non-uniform matte finish on molded lipstick involves "flaming" the lipstick after it has ben removed from the mold. While flaming has been found to improve the finish of the lipstick, the degree of improvement is limited. Thus, ultra-glossy or "wet look" finishes cannot be achieved by flaming. Moreover, some lipsticks, such as those with molded indicia or those with low melting temperatures, are not suitable for flaming.

A second method for achieving a glossy finish is to coat the surface of the cosmetic product with silicone or a silicone derivative. Because of various problems, including absorption of the coating by the product and poor uniformity of product gloss, a method has been developed to increase adhesion between the coating and the cosmetic material and to prevent absorption of the coating into the cosmetic material. This method disclosed in copending patent application Ser. No. 07/296,230, Filed Jan. 12, 1989, now U.S. Pat. No. 4,978,500 still requires additional post-molding processing to achieve a uniform high-gloss surface.

Mold adhesion also necessitates frequent cessations between molding cycles to allow workers to clean, replace or otherwise maintain a mold.

Thus, there is a real need for an alternate production method which improves the finish of the molded lipstick without requiring additional steps in the production process beyond the molding itself.

Methods of reducing work stoppage to clean or repolish molds have primarily focused on the application of releasing agents such as silicone derivatives, Teflon spray, carbon or molybdenum disulfide after every few mold cycles. These releasing reagents have the disadvantages of requiring repeated application as well as releasing potentially harmful vapors. Teflon cannot be used to permanently coat any mold for which there is a requirement that the product have a smooth surface because Teflon gives a granular texture to any surface to which it is bonded.

All of the above-mentioned adhesion-related problems are applicable to molds of any composition, but are especially relevant to molds which could be made primarily of a polymer material. Polymer molds can be made less expensively, perhaps to the point of disposability, than metal molds. However, due to the high adhesion between polymers and the materials in lipstick or other molded cosmetic products, it has been impractical to use polymer molds in the cosmetic industry. There is therefore a need for polymer molds to be pretreated in a manner which greatly reduces the adhesion between the molds' walls and the material being molded.

SUMMARY OF THE INVENTION

Accordingly, the present invention relates to the application of a process for treating a polymer mold or a polymer mold insert, such as that for a lipstick, comprising subjecting the inner surface of the polymer mold or polymer mold insert to a halogen plasma treatment gas in a vacuum, for a sufficient period of time to form an anti-adhesive surface layer on the inner surface of the polymer mold or polymer mold insert. We will refer to the results of the surface modification as being those of decreased adhesion, increased wetting angle or decreased surface free energy.

The wetting angle (contact angle) is the measurement angle between a liquid and solid, i.e., substrate surface. This measurement gives an indication of the relative values of the forces of adhesion and cohesion that result in interfacial tension. As referred to herein, the term "wetting angle" describes the ability of a specific solid to be wet by a specific liquid under defined conditions. Thus, the greater the "wetting angle", the lower the "wettability" of that solid surface by the specified liquid (as shown by Zisman, Advances in Chemistry Series, Ch. 1, Equilibrium Contact Angle).

The plasma treatment gas is preferably selected from the group consisting of ethylene tetrafluoride ($C_2F_4$), fluoroethane ($C_2F_6$), fluorine ($F_2$) and methyl fluoride ($CH_3F$).

The plasma treatment is performed in a vacuum chamber and preferably is in the form of a cold plasma glow discharge treatment.

The inner surface layer on the polymer mold or polymer mold insert is halogenated, preferably with a fluorinated treatment gas, and has a thickness of about 10 to about 1000 Angstroms.

BRIEF DESCRIPTION OF THE DRAWINGS

For a better understanding of the invention, reference is made to the following detailed description considered in conjunction with the accompanying drawings, in which:

FIG. 4 is an exploded diagram of a metal lipstick mold, similar to that described in FIG. 1 above, with a plasma-treated disposable polymer mold insert and lipstick product;

FIG. 5 is a cross-sectional view of a metal lipstick mold and a polymer mold insert showing an anti-adhesive surface on the inner walls of the insert;

FIG. 7A is a cross-sectional view of a cathode projection having a centrally located plasma treatment gas flow duct. FIG. 7B is a cross sectional view of a cathode projection having a laterally positioned gas-sectioned flow duct.

FIG. 8 is a perspective view of a mold-holding fixture used in the vacuum chamber of FIGS. 6 and 7;

FIG. 8A is a cross-sectional view of a threaded mount containing a centrally located plasma treatment gas flow duct.

DETAILED DESCRIPTION OF THE EXEMPLARY EMBODIMENTS

The present invention relates to treating molds and mold inserts made from carbon base polymers such as polyalkylenes containing between two and eight carbon atoms, polyamides, styrenics, polyacetals, polycarbonates, polyacrylates, polysulfones, polyesters, cellulosics, cross-linked polymers, thermosetting resins and other suitable thermoplastics; and mold inserts made from a polymer selected from the foregoing groups such as polyethylene, in a manner which decreases the adhesion between the walls of the mold and the material being molded, for use in the production of ultra-glossy lipstick. While the invention has applicability to many different cosmetics molds as well as molds used in other industries it will be described below in connection with lipstick molds.

Figure 1:
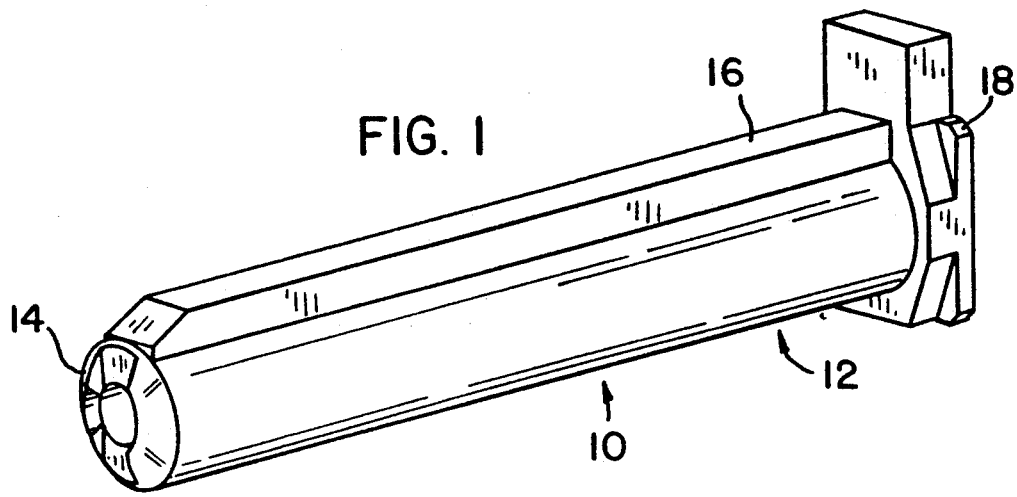
FIG. 1 is a perspective lateral view of a polymer mold for use in the manufacture of lipstick.
Figure 2:
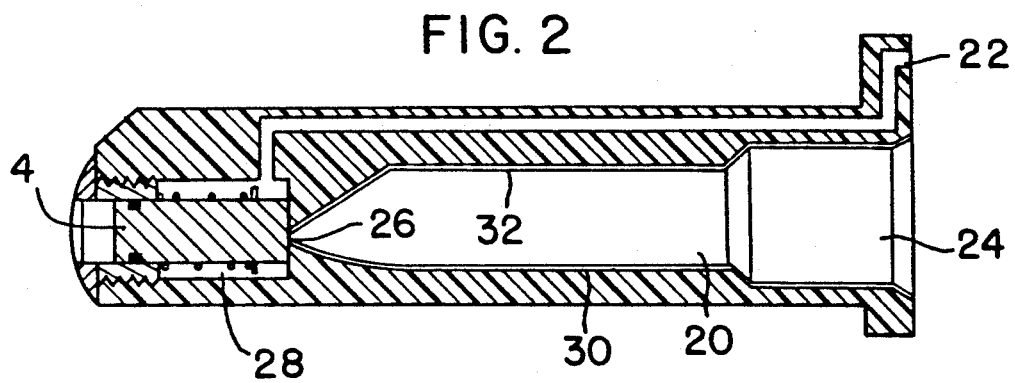
FIG. 2 is a cross-sectional view of a mold, as described in FIG. 1 above, constructed of a polymer and treated in accordance with the present invention.

Referring to FIGS. 1 and 2, there is shown a perspective view of a polymer lipstick mold which has a cylindrically-shaped barrel 12 with a spring-loaded valve 14 removably screwed into a threaded bore 28 at a lower end and a cavity opening 24 at an upper end. The housing 16 of a compressed-air duct 22 runs laterally along the barrel 12 from the cuff 18 to at least the proximal end of the valve 14, where the lower end of the duct 22 opens into the threaded bore 28. The cuff 18 is shaped to fit a conveyor adapter (not shown) which serves as the means by which the mold 10 is moved on the production line. When the mold 10 is suspended by the cuff 18, the mold cavity 20 extends down towards the valve 14 in the shape of an inverted lipstick. There is an aperture 26 at the end of the mold cavity 20 distal to the cavity opening 24, through which compressed air passes from the threaded bore 28 into the mold cavity 20. The spring-loaded valve 14, which is commonly made of a metal, seals off the aperture 26 until lipstick product is ready to be removed from the mold cavity 20. When lipstick product is sufficiently cooled, a compressed-air injector (not shown) is attached to the cuff 18 and barrel 12. The compressed air forces open the valve 14 and pushes the lipstick product into a lipstick base 36 (shown already together in FIG. 4) and out of the mold 10. On the cavity surface 30 there is seen an anti-adhesive surface layer 32 of a different chemical composition than the rest of the mold 10. This anti-adhesive surface layer 32 is the result of the exposure of the cavity surface 30 to a cold plasma glow discharge in the presence of one or more treatment gases.

The treatment process is carried out using the apparatus labelled above as FIGS. 6, 7, 8 and 9. These figures are further described below.

Figure 3:
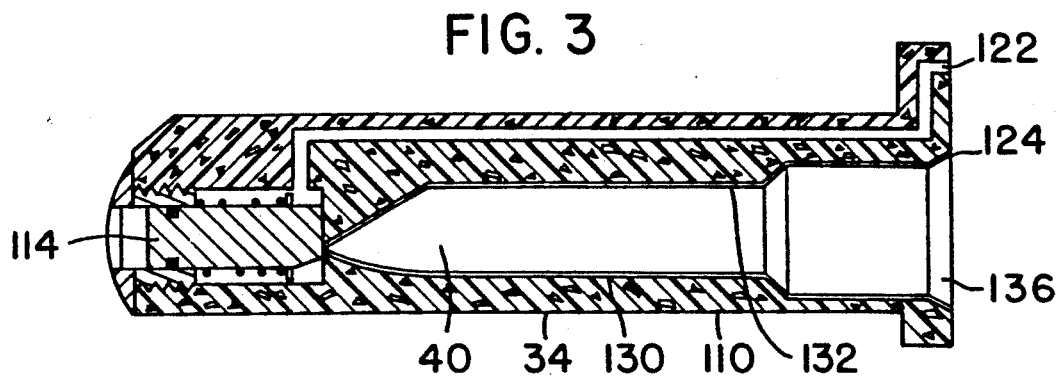
FIG. 3 is a cross-sectional view of a mold, as described above in FIG. 2, made of a polymer with a filler.

Three other exemplary embodiments of means for the production of lipstick in accordance with the present invention are illustrated in FIG. 3 and FIGS. 4 and 5. Elements illustrated in FIG. 3 and FIGS. 4 and 5 which correspond to the elements described above with respect to FIG. 1 and FIG. 2 have been designated by corresponding reference numerals increased by 100, 200 and 300, respectively. The embodiments of FIG. 3 and FIGS. 4 and 5 operate and are arranged in the same manner as the embodiment of FIGS. 1 and 2 unless it is otherwise stated.

With reference to FIG. 3, there is shown a lipstick mold 110 made of a filled polymer. The purpose of the filler is to change the heat transfer properties of the mold 110. A filler might also be used which selectively changes other physical or chemical properties of a plasma-treated mold, for example such properties as mold rigidity or selective product-mold surface adhesion. There is shown a lipstick base 136 inserted into the cavity opening 124. The lipstick base 136 is inserted after the pouring and partial cooling of the liquid product in the treated mold 110. The lipstick product 40 is then pushed up into the lipstick base 36 by compressed air, as described above. This manufacturing step is not varied among the embodiments herein described.

In FIGS. 4 and 5 there is shown an embodiment in which a polymer mold insert 238, (FIG. 4) which has been plasma-treated, is inserted into a conventional metallic lipstick mold 210. The mold liner 38 has an anti-adhesive surface layer 232 similar to that of the polymer lipstick mold 10 in FIG. 2.

In FIG. 4 there is shown an embodiment wherein a polymer mold insert 238, which has been plasma-treated, is inserted into a conventional metallic-like lipstick mold 210. Also shown in FIG. 4 are a finished lipstick product 240, having a conventional, plastic base 236 affixed thereto, as extracted from said conventional metallic lipstick mold 210. As shown in FIG. 5, the mold insert 338 has an anti-adhesive surface layer 232 similar to that of the cavity surface 330 within the polymer lipstick mold in FIG. 2.

The mold insert 238 permits the use of a conventional metallic mold 210. The mold insert 238 may be disposed of after one use, recycled for re-use, or used as part of a final hygienic product package. In this last example, the consumer would remove the insert 238 prior to use, thereby ensuring the product's hygiene and preserving the integrity of the product finish until the product is used.

FIGS. 7A and 7B are cross-sectional view of cathode projections having a centrally located plasma treatment gas flow-duct in a laterally positioned gas-sectioned flow-duct, respectively. The cathode projections are circularly affixed and downwardly extended from the removable cover plate for the mold-holding fixture 46 as shown in FIG. 8. FIG. 8 illustrates the mold-holding fixture 46 having circularly positioned therein threaded mounting projections upwardly extended therefrom and upon which the polymer molds are screwed thereon, in preparation for the halogen plasma treatment.

Figure 6:
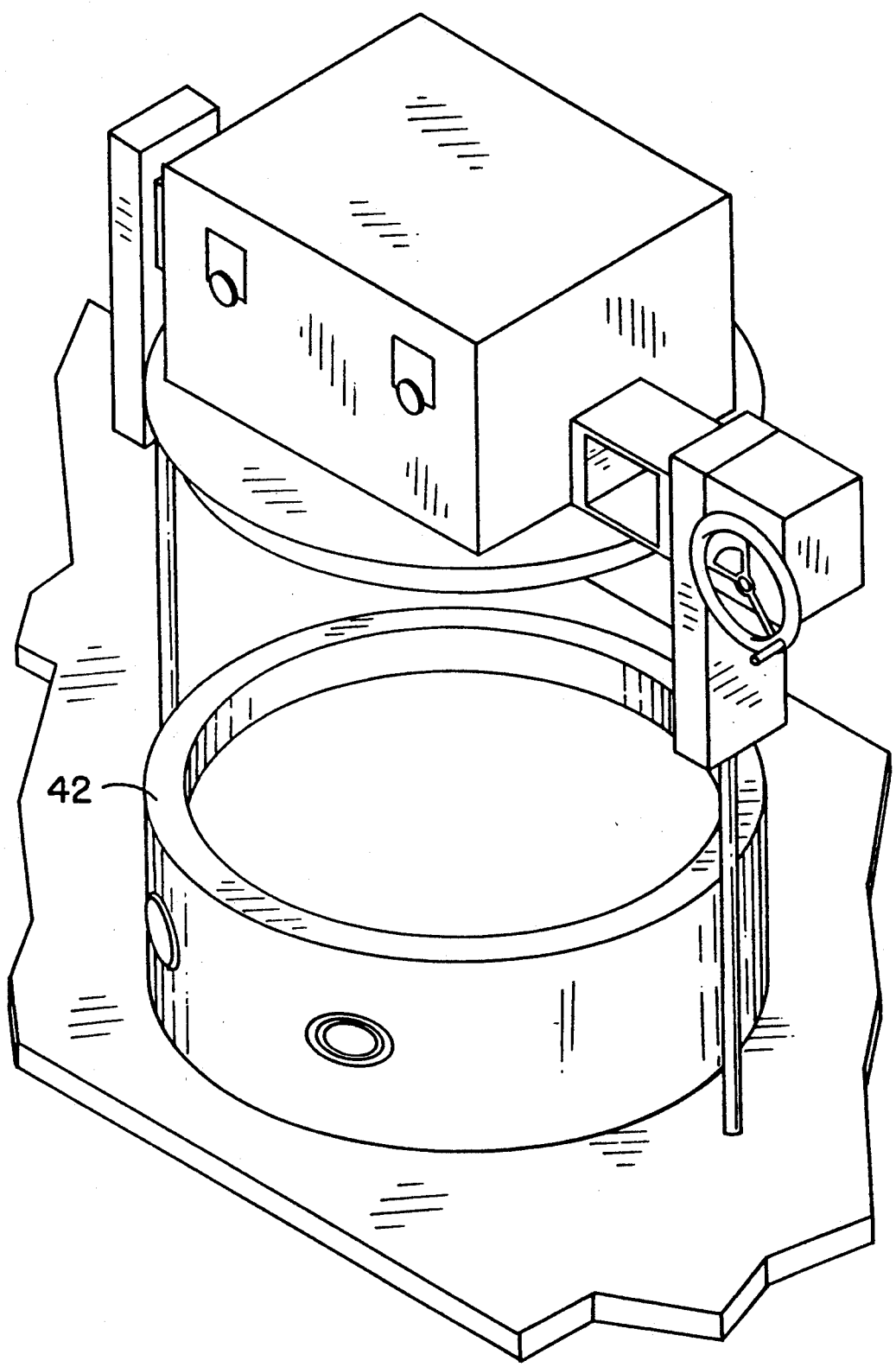
FIG. 6 is a detailed perspective upper view of a vacuum chamber which is used in connection with a chemical vapor deposition system, the vacuum chamber being shown in its open position.
Figure 7:
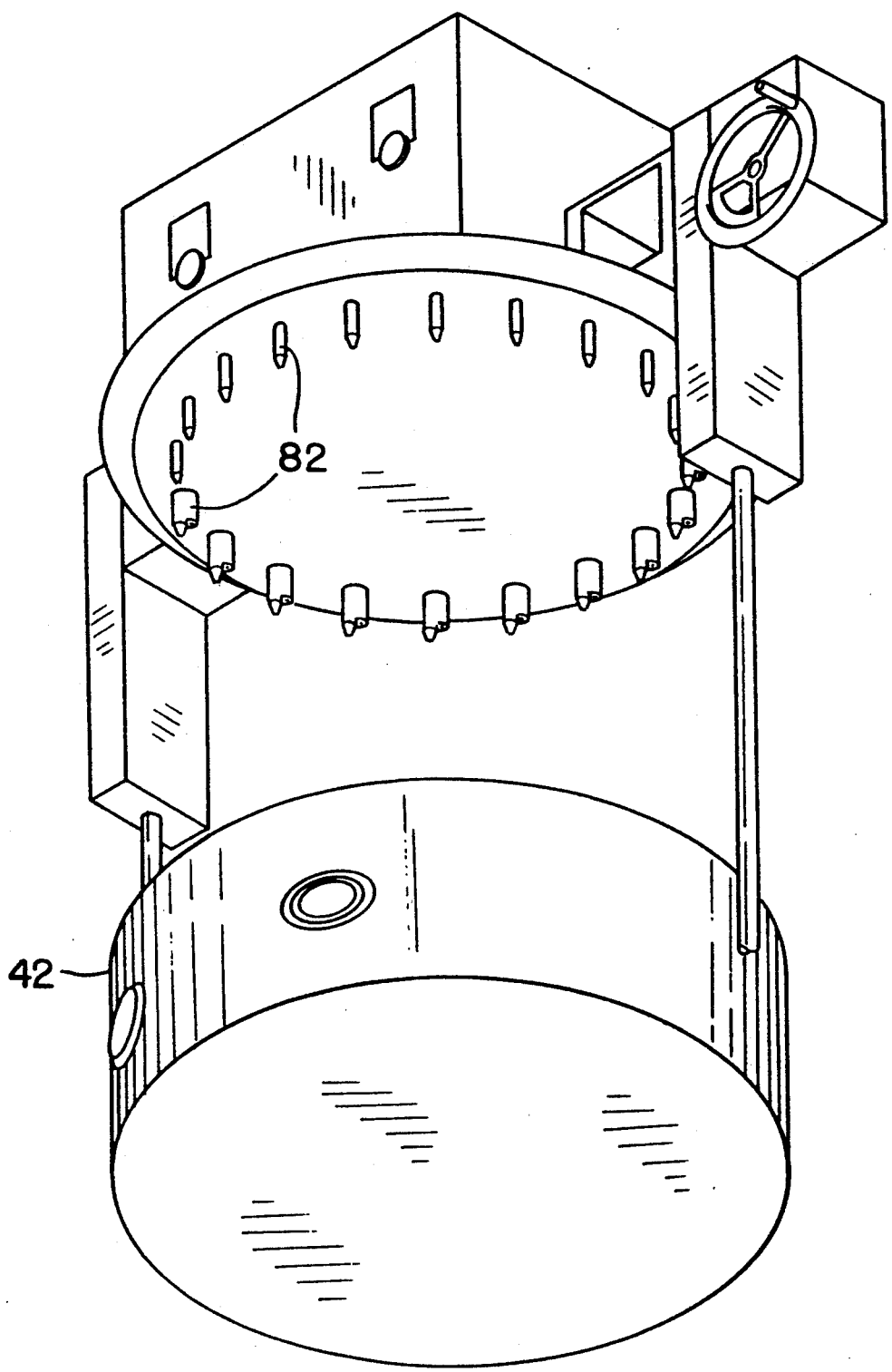
FIG. 7 is a detailed perspective view from below the vacuum chamber described in FIG. 6 above.

With reference to FIGS. 6, 7, and 8A the threaded bore 28 (see FIGS. 1 and 2) is the means by which the mold 10 is mounted onto the apparatus mold-holding fixture 46. The valve 14 must be removed from the threaded bore 28 to allow mounting and is replaced after the treatment process described below. The molds 10 are screwed onto threaded mounts 44 provided on the fixture 46, which is removably secured in the vacuum chamber 42. When the vacuum chamber 42 is operating at full capacity, each of the threaded mounts 44 would have a lipstick mold screwed onto it. Once the vacuum chamber 42 has been loaded, it is closed in preparation for the performance of a plasma treatment process using a chemical vapor deposition system 48 (see FIG. 9). FIG. 8A a cross-sectional view of a threaded mount 44 provided with a centrally located plasma treatment gas flow-duct 51.

Figure 9:
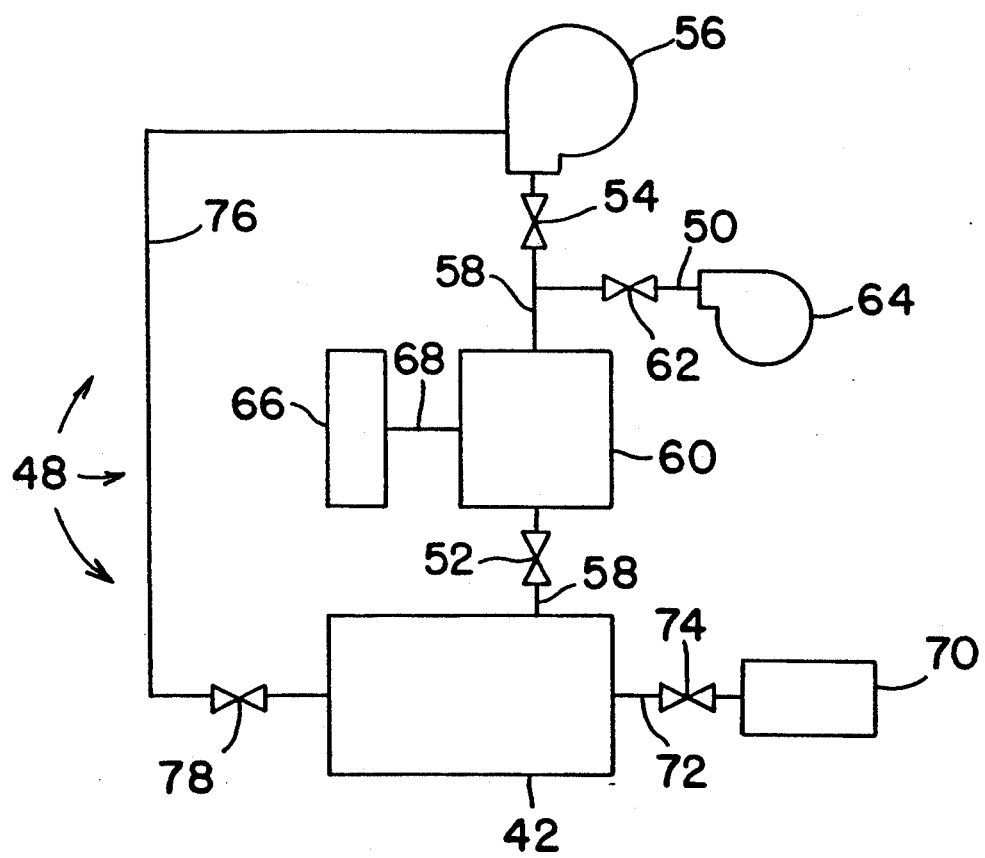
FIG. 9 is a flow diagram of a chemical vapor deposition system which incorporates the vacuum chamber illustrated by FIGS. 6 and 7, and which performs a cold plasma glow discharge treatment process in accordance with the present invention.

Referring to FIG. 9, a chemical vapor deposition system 48 includes, in addition to the vacuum chamber 42, a vacuum pump 56, which is connected to the vacuum chamber 42 by a foreline 58. A cold trap 60 is positioned in the foreline 58 between the vacuum chamber 42 and the vacuum pump 56. The foreline 58 includes a valve 52 between the vacuum chamber 42 and the cold trap 60. Another valve 54 is positioned in the foreline 58 between the vacuum pump 56 and the cold trap 60. A refrigerant unit 66 supplies refrigerant to the cold trap 60 through a line 68. A line 50, which is provided with a valve 62, connects a holding pump 64 to the foreline 58 between the valve 54 and the cold trap 60. The vacuum pump 56 is also connected to the vacuum chamber 42 by a roughing line 76, which includes a valve 78. Treatment gas is supplied from a source 70 to the vacuum chamber 42 through a line 72, which includes a valve 74.

With the valves 62 and 78 open and the valves 52, 54 and 74 closed, the vacuum chamber 42 is evacuated through the roughing line 76 by the vacuum pump 56 until a vacuum measurement of 50 microns or less is achieved. After such a vacuum has been created in the vacuum chamber 42, the valves 62 and 78 are closed and the valves 52 and 54 are opened. When a vacuum measurement of 5 microns or less is reached, the valve 74 is opened to admit an inert, flushing gas such as helium up to a pressure of between 100 to about 1000 microns for a period of between 5 minutes to about 30 minutes. Shortly thereafter, the chamber 42 is re-evacuated to a pressure of between 5 microns to about 50 microns. Then a treatment gas or a mixture thereof, such as $C_2F_4$, $F_2$, $CH_3F$ or the like is allowed to bleed into the vacuum chamber 42 through gas-feed lines 84 and 86 until a vacuum pressure of about 50 microns is reached. The treatment gas may be introduced in combination with a carrier gas, for example helium or nitrogen dioxide, in a ratio of between 5-95% treatment gas, preferably 20%.

The treatment gas is maintained in the vacuum chamber 42 for a length of time, between 30 seconds and 15 minutes, sufficient to permit the treatment gas to saturate the surface of the lipstick molds 10 contained in the vacuum chamber 42. At the end of the saturation period, the treatment gas is energized by the cathodes to generate a cold plasma glow discharge throughout the vacuum chamber 42. The plasma, in turn, chemically reacts with the surface of the polymer lipstick molds 10.

At the conclusion of the plasma treatment process, which takes between 30 seconds and 120 minutes, the valves 52 and 54 are closed, while the valve 74 is left open until the vacuum chamber 42 is equal to ambient conditions (i.e., atmospheric pressure). The valve 74 is then closed and the vacuum chamber 42 is opened.

After opening the vacuum chamber 42, the molds 10 are removed from the fixture 46. Because the plasma treatment is conducted with diluted levels of treatment gas, the molds 10 do not undergo any appreciable distortion nor do they lose any of the bulk physical characteristics of the polymer.

Directing treatment gas into each individual mold 10 assures that the treatment gas reaches all the internal surfaces of the mold, no matter how convoluted the surfaces. This is accomplished by means of an individual gas feed line 84 for each mold. The gas feed line 84 either runs down alongside or through each of the projections 82. Treatment gas can also be fed up into each mold 10 being treated through a hole 86 in the threaded mounts 44. Also for purposes of ensuring uniformity of the molds' exposure to the plasma, the cathode plate 80 has multiple projections 82 (see FIGS. 6 and 7) leading vertically down. These projections protrude down into each mold 10 mounted on the fixture 46. The projections 82 assure that the treatment gas is properly energized at all the internal surfaces of the mold with which it comes in contact, no matter how convoluted the surface.

The treatment gas could be any gas, or mixture of gases, which contains fluorine or another halogen. In fact, . any plasma reactive gas capable of bonding to carbon atoms or other species on the surface of the molds 10 could be used as the treatment gas. The treatment gas, which is preferably selected from the group consisting of $C_2F_4$, $F_2$, or $CH_3F$ or the like, provides a surface layer 32 which is less polar than a hydrocarbon surface and hence less adhesive to a compound such as lipstick which is primarily made of waxes, oils, pigments and additional, optional components. Even non-plasma reactive gases, for example room air, might be employed as the treatment gas. By using air as the treatment gas, the surface layer 32 would be more polar and therefore more adhesive to compounds of this nature.

As a result of the chemical reaction, the surface composition of the lipstick molds 10 is modified so as to obtain a surface layer 32 (see FIG. 2) which, depending on the treatment gas used, has decreased adhesion with respect to the cosmetic product being molded. Typically, the surface layer 32 has a thickness in a range of from about 10 angstroms to about 1000 angstroms. Using one of the above-named fluorinated treatment gases results in a polymer mold 10 or a polymer mold liner 38 to which lipstick will not adhere.

Reduced adhesion results in many practical and economic advantages including: (1) elimination of the need for releasing agents; (2) quicker cycle time; (3) less mold "down-time" for cleaning and polishing; (4) reduced cost of manufacturing molds which can be made from polymers; (5) enhanced ability to make a product with a surface which more exactly mirrors the mold's surface; (6) the ability to mold indicia and other textured patterns on some product surfaces with greater accuracy and detail; and (7) the ability to use conventional metal molds in conjunction with a polymer mold insert (see FIGS. 4 and 5) which may be reused, retained as part of a hygienic package or discarded.

It will be understood that the embodiments described herein are merely exemplary and that a person skilled in the art may make many variations and modifications without departing from the spirit and scope of the invention.

The following examples further illustrate certain aspects of the present invention and are not intended to limit the scope thereof to such.

EXAMPLE I

Polymer molds of the type shown in FIG. 2, having the inner walls thereof modified, in accordance with the present invention, were prepared utilizing the apparatus illustrated in FIGS. 5-9. A series of polyethlyene molds of the type shown in FIG. 1 were placed in a mold-holding fixture as shown in FIG. 8 and positioned within a vacuum chamber such as that illustrated in FIG. 7. The foregoing vacuum chambers assembly, having the mold-holding fixture positioned therein, was incorporated in a chemical vapor system similar to that illustrated in FIG. 9, wherein the fluorination process was carried out as follows:

The polyethylene molds thusly positioned as described herein were treated with a fluorinated gas which was introduced into the vacuum chamber. Initially, the vacuum pressure was gradually adjusted to a level of 50 microns or less and thereafter adjusted to a level of between 5 microns or less. The treatment in fluorinated gas was then introduced into the vacuum chamber and maintained therein for a period of between 30 seconds and 15 minutes so as to allow complete saturation throughout the mold cavity. Upon completion of the fluorine saturation, a cold glow discharge was generated throughout the vacuum chamber by means of direct electrical excitation of the treatment gas, thus initiating the chemical reaction of the plasma with the inner wall surfaces of the polymeric molds. The plasma gas treatment was carried out over a period of from 30 seconds to about 120 minutes. Thereafter the pressure within the vacuum chamber was readjusted to ambient conditions and the thusly modified polyethylene molds were removed from the mold-holding fixture.

Subsequent testing of the polyethylene molds indicated that the inner walls thereof had been fluorinated to a thickness of from between 100 and 1000 Angstroms and, that the respective wetting angles have been greatly increased from between 70-80 to about 120-130 degrees. These results were determined by means of conventional ESCA and goniometer apparata, respectively.

The above-described modified, polyethylene molds were subsequently utilized in the production of a series of conventional lipstick products. Upon visual inspection, it was observed that the resultant lipstick products exhibited uniform, high-gloss finishes which were vastly superior to those of conventional lipstick products.

EXAMPLE II

The procedural steps outlined in Example 1 hereinabove were repeated, except polymer molds having a metallic filler therein were utilized. In this instance, the polymer molds were comprised of a nylon base having aluminum flakes dispersed therein such as that shown in FIG. 3. The thusly modified inner walls of the resultant polymer molds exhibited the desired characteristics of increased wetting angles, (i.e., greatly reduced surface adhesivity similar to those obtained in Example I).

The above-described modified, polyamide molds were subsequently utilized in the production of a series of conventional lipstick products. Upon visual inspection, it was observed that the resultant lipstick products exhibited uniform, high-gloss finishes which were vastly superior to those of conventional lipstick products.

We claim:

1. An improved lipstick product having a uniform, ultra glossy wet look surface finish which is obtained solely by the following molding process:
   (a) mounting a polymeric lipstick mold or polymeric lipstick mold insert having a threaded bore and made of an ingredient selected from the group consisting of polyalkylenes, having 2-8 carbon atoms, polyamides, styrenics, polyacetals, polycarbonates, polyacrylates, polysulfones, polyesters, and cellulosics, to a mold holding fixture containing a plurality of threaded mounts, by screwing the threaded bore into the threaded mounts,
   (b) placing the molds and mold holding apparatus into a vacuum chamber,
   (c) closing and evacuating the vacuum chamber,
   (d) introducing into the vacuum chamber and into each individual mold through a separate gas feed line, a treatment gas selected from the group consisting of ethylene tetrafluoride, fluoroethane, silicone fluoride, fluorine, and methyl fluoride,
   (e) forming an anti-adhesive surface layer of 10-1000 angstroms on the inner surface wall of each mold or mold insert with a cold glow discharge of said treatment gas plasma, and molding a lipstick material in said mold or mold insert whereby said anti-adhesive surface layer reduces the surface adhesivity between said polymer and the surface of the material being molded.

* * * * *